United States Patent
Lam et al.

(10) Patent No.: US 8,410,812 B2
(45) Date of Patent: Apr. 2, 2013

(54) "SUPPLY-LESS" HDMI SOURCE TERMINATED OUTPUT STAGE WITH TUNED WIDE-RANGE PROGRAMMABLE TERMINATION

(75) Inventors: Nelson Lam, Mississauga (CA); Dino A. Toffolon, Stoney Creek (CA)

(73) Assignee: Synopsys, Inc., Mountain View, CA (US)

( * ) Notice: Subject to any disclaimer, the term of this patent is extended or adjusted under 35 U.S.C. 154(b) by 531 days.

(21) Appl. No.: 12/604,115

(22) Filed: Oct. 22, 2009

(65) Prior Publication Data

US 2011/0096848 A1  Apr. 28, 2011

(51) Int. Cl.
*H03K 17/16* (2006.01)
*H03K 19/003* (2006.01)

(52) U.S. Cl. .......................................... 326/30; 375/257

(58) Field of Classification Search ........................ None
See application file for complete search history.

(56) References Cited

U.S. PATENT DOCUMENTS

| | | | |
|---|---|---|---|
| 7,382,153 B2 * | 6/2008 | Ou-yang et al. | 326/30 |
| 7,649,409 B1 * | 1/2010 | Koh et al. | 327/559 |
| 7,859,298 B1 * | 12/2010 | Swartz et al. | 326/30 |
| 7,898,295 B1 * | 3/2011 | Kasturirangan et al. | 326/86 |
| 2004/0032319 A1 * | 2/2004 | Kyung | 338/320 |

OTHER PUBLICATIONS

Parker, James F. et al. "A 15mW 3.125GHz PLL for Serial Backplane Transceivers in 0.13 μm CMOS", ISSCC 2005, pp. 412-413, 607.
Krishna, Kannan et al. "A 0.6 to 9.6 Gb/s Binary Backplane Transceiver Core in 0.13 μm CMOS", ISSCC 2005, pp. 64-65, 585.

* cited by examiner

*Primary Examiner* — Crystal L Hammond
(74) *Attorney, Agent, or Firm* — Bever, Hoffman & Harms, LLP; Jeanette S. Harms

(57) ABSTRACT

A "supply-less" transmitter output stage is provided for a transmitter. This transmitter output stage can include a tunable source termination and a reference voltage generator. The tunable source termination can be coupled between a differential pair of the transmitter. The reference voltage generator can advantageously generate reference voltages from a far-end termination. These reference voltages provide a way of translating the internal supply voltage level to the pad voltage level to enable/disable the tunable source termination. Also, it provides a way to minimize leakage and minimize the junction stress of switching transistors in the tunable source termination as well as the transmitter. The dependency between the reference voltages and the far-end termination voltage makes this design more portable to other supply voltages and other technologies specifications other than HDMI.

29 Claims, 6 Drawing Sheets

"SUPPLY-LESS" HDMI SOURCE TERMINATED OUTPUT STAGE WITH TUNED WIDE-RANGE PROGRAMMABLE TERMINATION

BACKGROUND OF THE INVENTION

1. Field of the Invention

The present invention relates to a DC coupled transmitter, and in particular to a DC coupled transmitter including a tunable source termination circuit that can be enabled/disabled with an internal supply voltage less than or equal to the sink termination voltage and without device stress.

2. Related Art

In deep sub-micron processes, the maximum I/O voltage is beginning to scale along with the technology. For example 3.3 V I/O supply and devices are commonly available in 90 nm, but in 65 nm and beyond, the migration to 2.5 V and even 1.8 V input/output (I/O) devices and supply is occurring rapidly. This scaling creates a problem for conventional implementation of source termination in a high performance DC coupled transmitter, such as a high-definition multimedia interface (HDMI™) transmitter, where the far-end termination voltage is 3.3 V.

FIG. 1 illustrates a simplified HDMI system including a transmitter PHY 101 and a receiver PHY 104 (wherein PHY refers to the physical layer). An exemplary transmitter PHY 101 could represent an audio/visual source (e.g. a set-top box, DVD player, PVR, etc). As shown in FIG. 1, transmitter PHY 101 includes a transmitter 102 having a differential pair of pins txp and txm. An exemplary receiver PHY 104 could represent an A/V monitor (e.g. a digital television (DTV) etc.). Receiver PHY 104 includes a receiver 106 and a far-end termination 105.

Notably, the HDMI standards (V1.3 and V1.4) specify that the far-end termination voltage should be 3.3 V±5%. Unfortunately, implementing the transmitter output stage with a lower supply (e.g. 2.5 V or 1.8 V) can lead to reliability problems, leakage paths (see leakage path 110 from receiver PHY to transmitter PHY in FIG. 1), and even an inability to enable/disable termination. Addressing these problems, while meeting all the necessary HDMI specifications with regards to eye diagram mask and source DC characteristics (e.g. single-ended output voltage swing and level) has proven to be difficult.

One conventional approach to resolve these problems while meeting design specifications is to use a differential fixed termination external to transmitter PHY 101. This non-integrated solution is extremely costly and therefore not commercially viable. On the other hand, a fixed termination internal to transmitter PHY 101 can easily violate HDMI specifications where source termination is prohibited at data rates below 1.65 Gbps.

Another conventional approach is to have a dedicated near-end 3.3 V supply for the transmitter output stage. This configuration allows for a relatively straightforward source termination, but does not eliminate the leakage paths in the case when the near-end 3.3 V transmitter voltage is removed and the far-end termination voltage is still engaged (which occurs in actual HDMI applications). Furthermore, requiring a dedicated 3.3 V transmitter supply voltage is contrary to the current migration to low voltage I/O devices.

Yet another conventional approach is not using any termination. However, reflections caused by large impedance mismatch between the near-end and the channel (or cable) will be an issue at high data rates and could violate current HDMI electrical specifications.

Therefore, a need arises for a commercially-viable source termination for an HDMI application that can be safely enabled/disabled with the near-end termination voltage (e.g. 2.5V) lower than the far-end termination voltage (e.g. 3.3V). Also, a need arises for a source termination that can provide a stress free condition where the junction voltage is less than the maximum I/O voltage, regardless of the state of the receiver PHY.

SUMMARY OF THE INVENTION

A "supply-less" transmitter output stage is provided for a transmitter. This transmitter output stage can include a tunable source termination and a reference voltage generator. The tunable source termination can be coupled between a differential pair of the transmitter. The reference voltage generator can advantageously generate reference voltages from a far-end termination. These reference voltages provide a way of translating the internal supply voltage level to the pad voltage level to control the tunable source termination. Also, it provides a way to minimize the junction stress of switching transistors in the tunable source termination as well as the transmitter. This dependency between the reference voltages and the far-end termination voltage makes this design more portable to other supply voltages and other technologies specifications other than HDMI.

The tunable source termination can include a plurality of transmitter termination slices. Each transmitter termination slice can include a switching transistor, a first resistor coupled between the switching transistor and one of the differential pair, and a second resistor connected between the switching transistor and the other of the differential pair.

The reference voltage generator can include a plurality of level-shift-up blocks (LSUs) coupled between the differential pair. Each LSU can provide a control voltage to a predetermined set of switching transistors. In one embodiment, the LSUs can provide binary weighted outputs to the transmitter termination slices. That is, each LSU can provide its output to a different number of transmitter termination slices.

Each LSU can include a third resistor and a fourth resistor connected in series between the differential pair. Each LSU can further include a first transistor and a second transistor connected in series between a first node located between the third and fourth resistors and a bias voltage. The first node can control at least one switching transistor.

The reference voltage generator can further include a fifth resistor and a sixth resistor connected between the differential pair. A common mode voltage (VCM) node between the fifth and sixth resistors can be connected to a well of each switching transistor. This biasing scheme minimizes the leakage between the far-end termination to the well of each switching transistor since the VCM voltage is derived from the same source. A set of resistors can be connected in series between the VCM node and ground, wherein a tap provided between resistors of the set of resistors provides a reference voltage that tracks the common mode voltage.

Notably, the reference voltage can control a gate of each first transistor. A termination control signal generated by the digital core can control a gate of each second transistor.

In one embodiment, the transmitter output stage can be used with a transmitter conforming to a high-definition multimedia interface (HDMI) specification.

A transmitter output stage in this differential configuration can ensure low overall system power. Further, this transmitter output stage can be easily integrated into deep sub-micron process nodes without the need for an external voltage supply or any external components (to the transmitter PHY), thereby ensuring low cost and low power implementation. Yet further, this transmitter output stage can ensure stress-free operation, thereby ensuring reliability of source termination.

A method to enable/disable a source termination of a transmitter is also provided. In this method, a plurality of parallel resistances between a differential pair of the transmitter can be provided. A set of parallel resistances from the plurality of parallel resistances can be selected for the source termination. A reference voltage from a common mode voltage associated with the differential pair can be derived (e.g. 'reference voltage'=k*'common mode voltage', where k<1). Any switch in the set of parallel resistances can be protected using the reference voltage.

DETAILED DESCRIPTION OF THE FIGURES

Conventional source terminations for HDMI systems are commercially non-viable. For example, some conventional HDMI systems require a non-integrated source termination. Other conventional HDMI systems use integrated HDMI source terminations that require a 3.3V supply and potential leakage issue.

Figure 1:
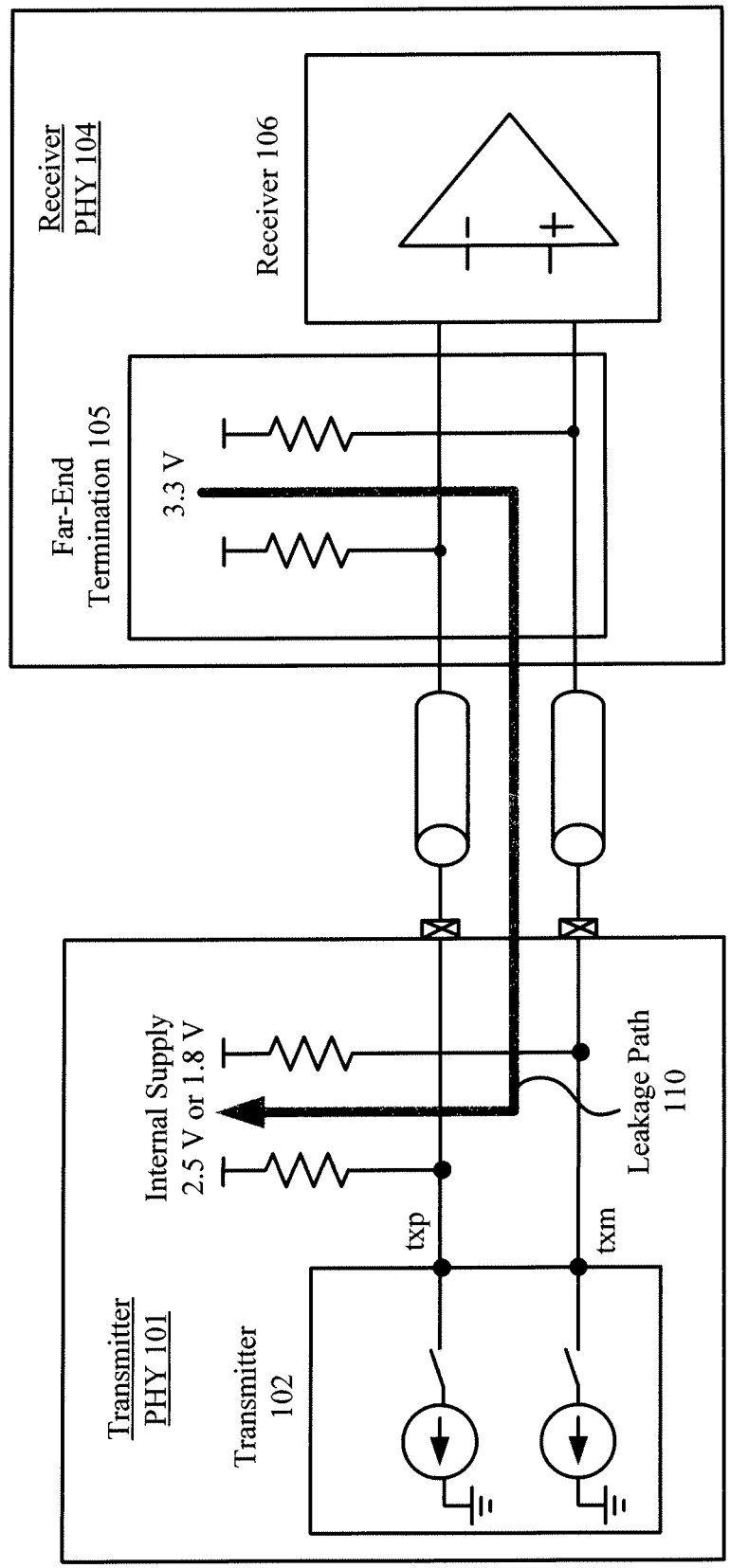
FIG. 1 illustrates a simplified HDMI system.
Figure 2:
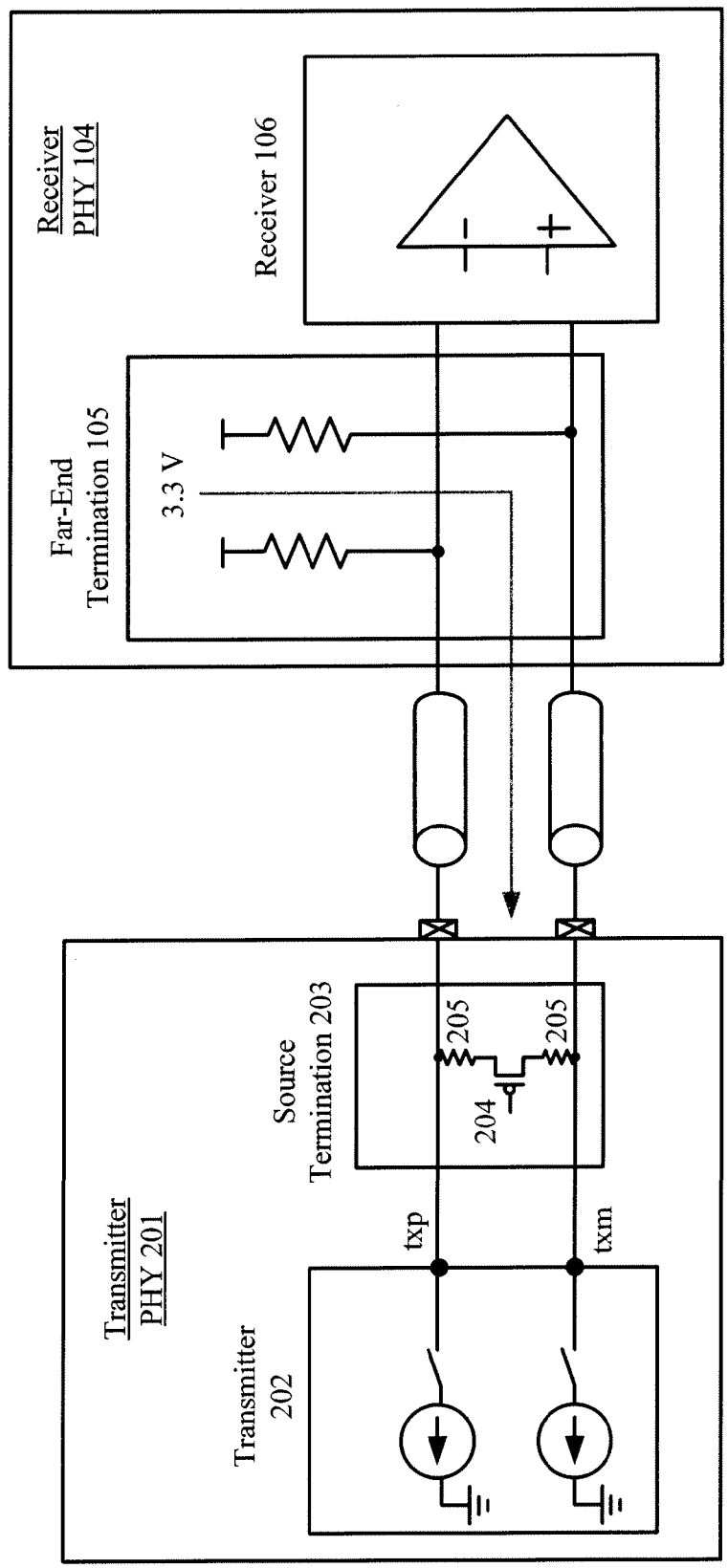
FIG. 2 illustrates an improved HDMI system including a differential source termination.

In accordance with an improved HDMI system, an internal (on-chip) tunable source termination can be coupled between a differential pair of the transmitter. For example, FIG. 2 illustrates an exemplary HDMI system including a transmitter PHY 201. Transmitter PHY 201 includes a transmitter 202 and a source termination 203. Notably, source termination 203 includes a p-type metal-oxide-semiconductor (PMOS) transistor 204 connected between resistors 205. These elements are connected between the differential pair txp and the txm of transmitter 202 such that a low voltage on the gate of transistor 204 connects txp and txm, thereby generating a predetermined resistance. Including transistor 204 in source termination 203 can advantageously provide programmable control over the generated resistance. Thus, transistor 204 imparts a tuning capability to source termination 203. Note that a differential connection also advantageously eliminates any leakage from the receiver PHY to the transmitter PHY as shown in FIG. 1.

Figure 3:
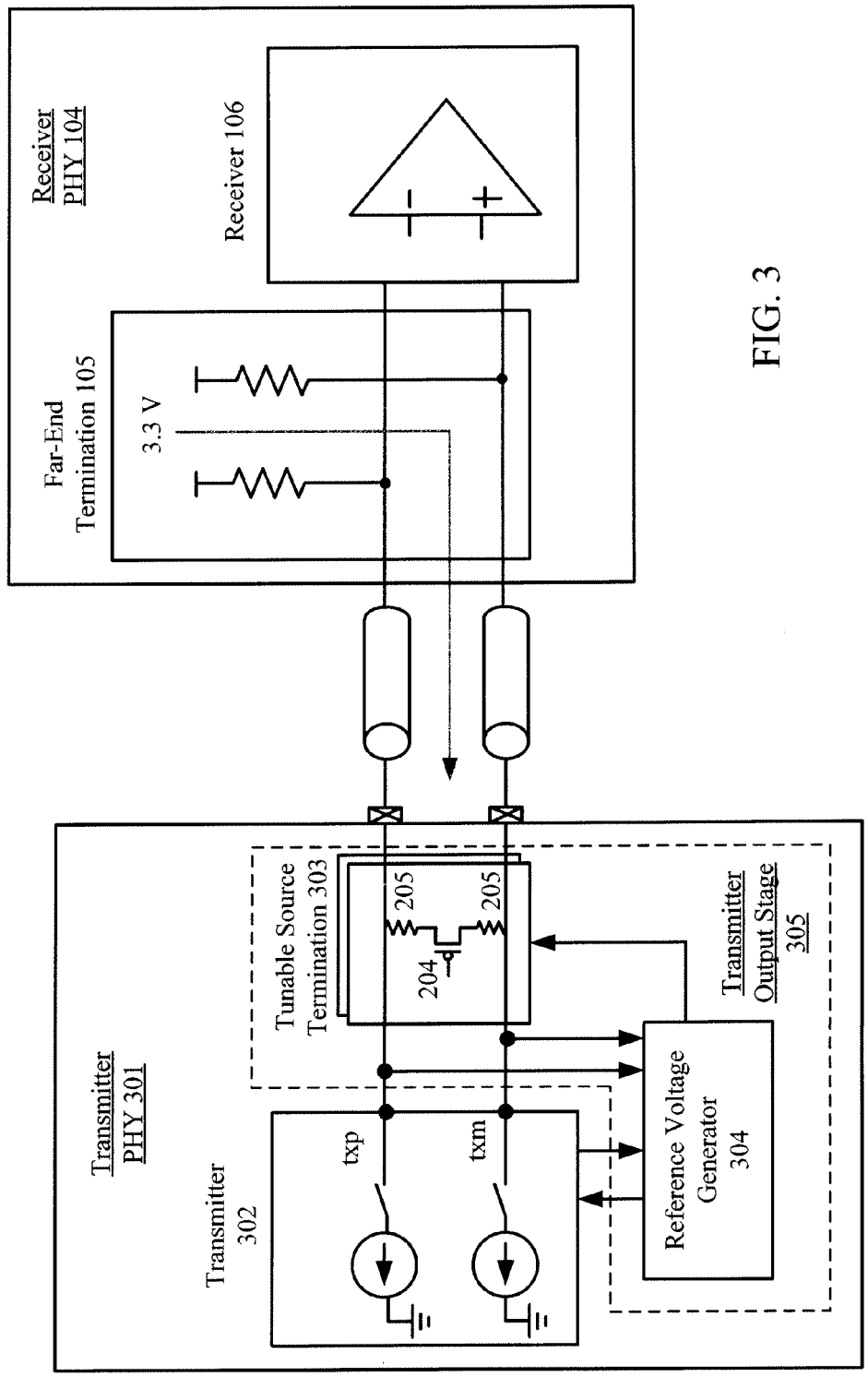
FIG. 3 illustrates an exemplary transmitter output stage including a tunable source termination and a reference voltage generator.

Note that in this embodiment, the far-end termination 105, which has a 3.3 V supply, can provide that 3.3 V on txp or txm. However, when a 3.3 V is applied on txp or txm, devices within transmitter 202 may experience junction stress. To address this issue, a reference voltage generator can also be included. For example, FIG. 3 illustrates an exemplary transmitter PHY 301 including a transmitter 302, a tunable source termination 303, and a reference voltage generator 304. Tunable source termination 303 and reference generator 304, which together form a transmitter termination 305, are discussed in further detail in reference to FIG. 4.

Figure 4:
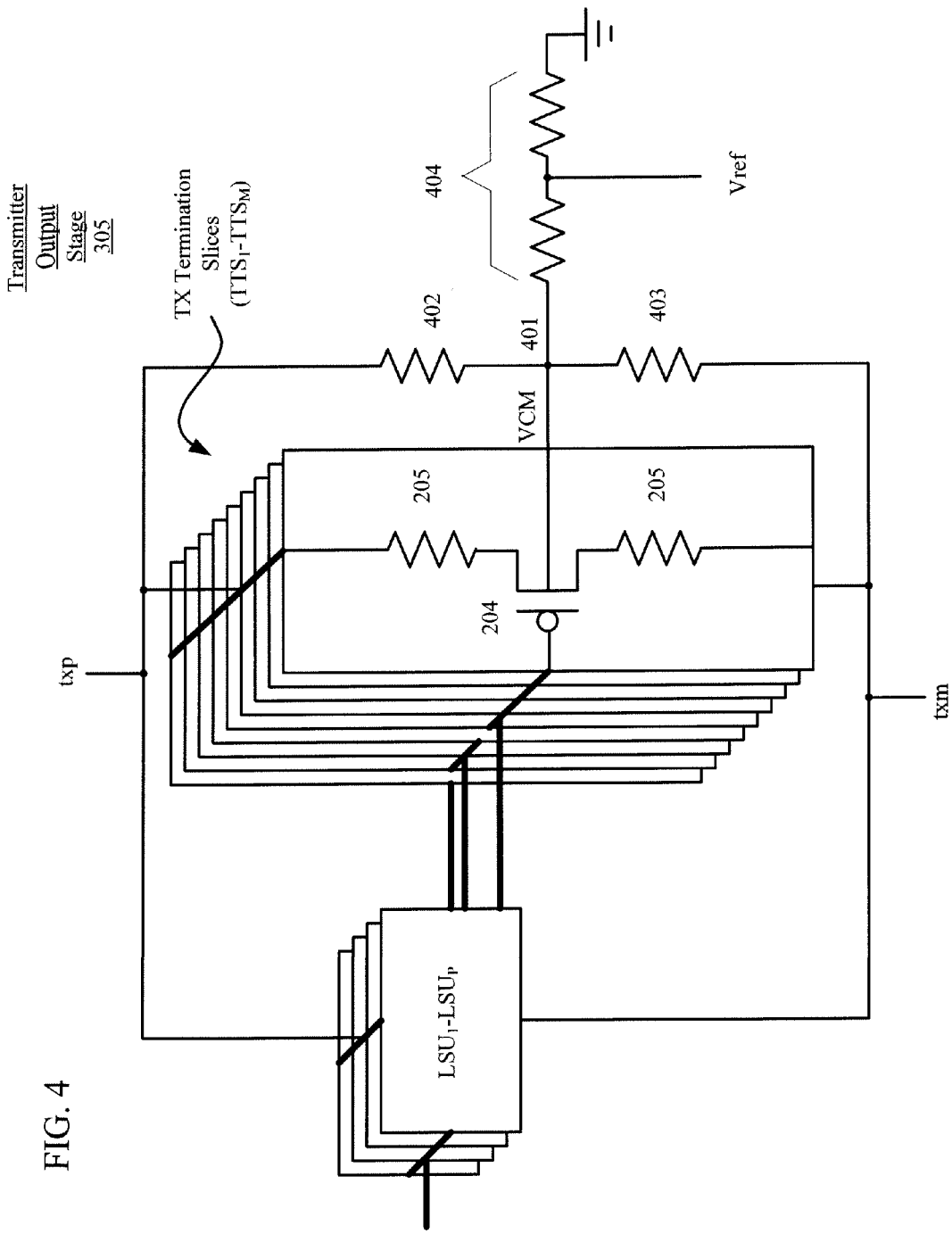
FIG. 4 illustrates an exemplary embodiment of the tunable source termination and the reference voltage generator.

FIG. 4 illustrates an exemplary implementation of a transmitter termination 305. In this embodiment, the tunable source termination can include a plurality of TX termination slices $TTS_1$-$TTS_M$, wherein M is a predetermined integer. The reference voltage generator can include a plurality of level-shift-up blocks $LSU_1$-$LSU_P$, wherein P is also a predetermined integer. In one embodiment, M and P are the same integers. In another preferred embodiment, M and P are different integers. The reference generator can further include a plurality of resistors 402-404.

Note that each TTS includes transistor 204 and resistors 205, which are coupled between txp and txm. In this configuration, turning on one or more transistors 204 of $TTS_1$-$TTS_M$ effectively implements a tunable resistor. Specifically, turning on more transistors 204 adds more resistors 205 in parallel which effectively lowers the output impedance.

The $LSU_1$-$LSU_P$, which are also coupled between txp and txm, are configured to provide control signals to the gates of transistors 204. For greater control (e.g. wider tuning range and higher resolution) over the tunable resistor implemented by $TTS_1$-$TTS_M$, more TX termination slices and control signals can be used. For example, in one embodiment, only 6 bits may be used to control the termination operation/resistance adjustment, i.e. P=6. In one embodiment, based on these 6 control bits, each LSU can be configured to provide gate control to a predetermined number of TTSs, wherein such predetermined number may vary between LSUs. For example, in one embodiment in which the LSU outputs are binary weighted, $LSU_1$ can provide a control signal to one slice $TTS_1$, $LSU_2$ can provide signals to 2 slices $TTS_2$-$TTS_3$, $LSU_3$ can provide signals to 4 slices $TTS_4$-$TTS_7$, $LSU_4$ can provide a control signal to 8 slices $TTS_8$-$TTS_{15}$, $LSU_5$ can provide a control signal to 16 slices $TTS_{16}$-$TTS_{31}$, and $LSU_6$-$LSU_7$ can provide a control signal to 32 slices $TTS_{32}$-$TTS_{64}$. Therefore, in this embodiment, M=64. In this example, $LSU_6$-$LSU_7$ can be connected in parallel to drive the 32 slices $TTS_{32}$-$TTS_{64}$ for faster response time.

Resistor 402 can be connected between VCM node 401 and txp, whereas resistor 403 can be connected between a VCM node 401 and txm. VCM node 401 can be further connected to the well of each transistor 204. This connectivity minimizes the leakage from the pad to the well of each transistor 204 since they are derived from the same source. In one embodiment, resistors 402 and 403 can be implemented using large resistors, e.g. from 500 kOhm to 1 MOhm. Note that VCM refers to the common mode voltage across txp and txm, i.e. (txp+txm)/2. Thus, resistors 402 and 403 can be used to generate the common mode voltage at VCM node 401.

In one embodiment, a set of resistors 404 can be connected serially between ground and VCM node 401. Each of resistors 404 can also be implemented using large resistors (e.g. from 500 kOhm to 1 MOhm), although sizing can vary between designs. Notably, a predetermined tap in the set of resistors 404 can provide a reference voltage Vref.

Figure 5:
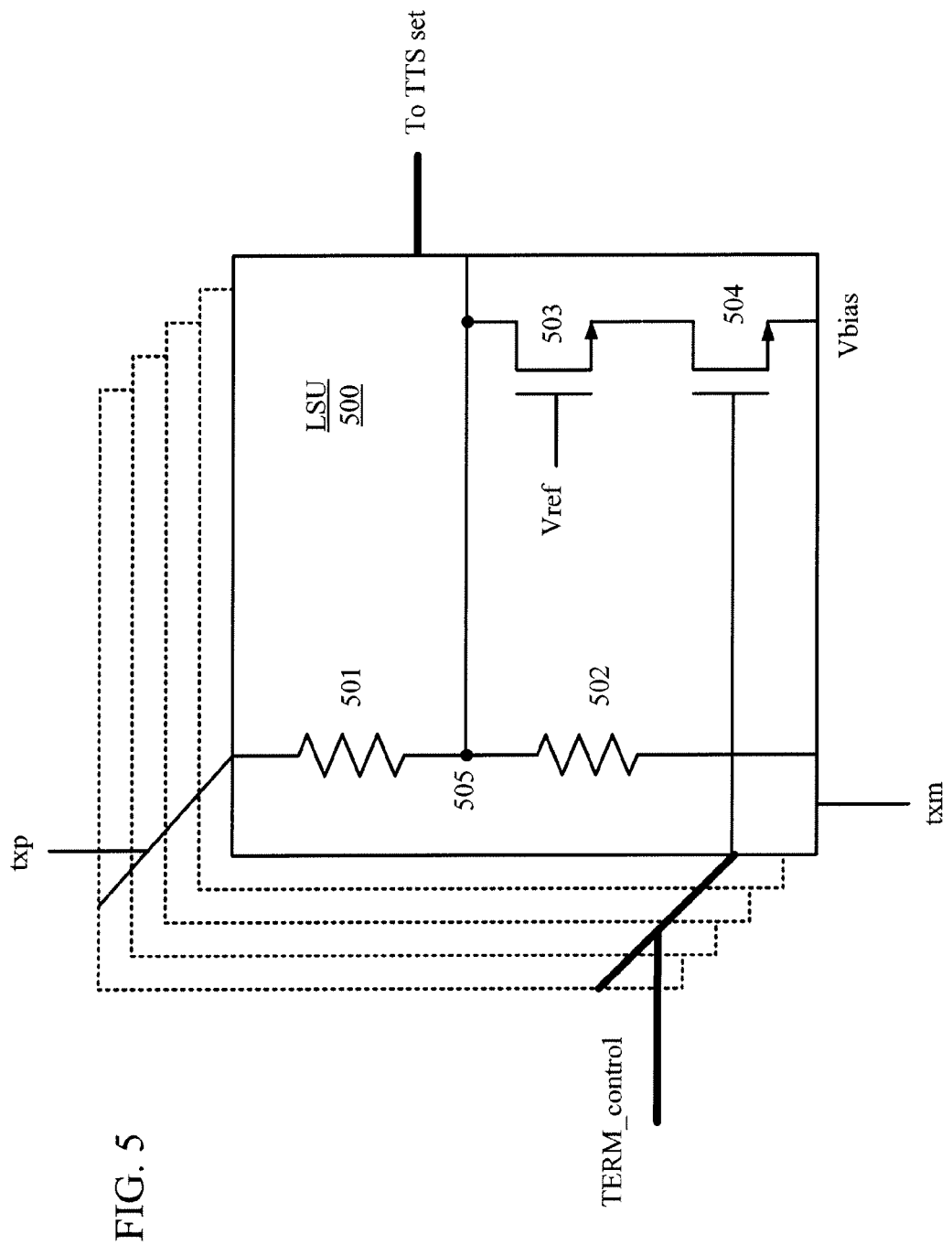
FIG. 5 illustrates an exemplary level-shift-up block (LSU), which forms part of the reference voltage generator.

Note that the position of the tap associated with Vref is based on a desired voltage that can protect certain transistors of $LSU_1$-$LSU_P$ (discussed in reference to FIG. 5). Vref can be characterized as VCM×k, where k is a constant less than 1.0 (i.e. Vref is proportional to VCM). In one embodiment, k=0.5. As described in further detail below, reference voltage Vref, as a tracking voltage of VCM, can advantageously ensure stress-free operation of transistors 503 and 204 when provided to each of $LSU_1$-$LSU_P$.

FIG. 5 illustrates an exemplary LSU 500 (other LSUs shown by dotted-line blocks to clarify connections) that includes resistors 501 and 502 as well as n-type MOS (NMOS) transistors 503 and 504. In this embodiment, resistors 501 and 502 are connected in series between txp and txm, thereby creating another differential coupling. Exemplary sizes for resistors 501 and 502 can range from 500 kOhm to 1 MOhm, and thus are considered large resistors. Note that smaller resistors may start to leak current, thereby adversely affecting termination resistance and reducing VCM. In one embodiment, resistors 501 and 502 as well as transistors 503 and 504 have similar sizing and fabrication characteristics between LSUs, i.e. between $LSU_1$-$LSU_P$ (FIG. 4).

Transistors 503 and 504 can be connected in series between a node 505, which is between resistors 501 and 502, and a bias voltage Vbias. In one embodiment, Vbias is a regulated bandgap-referenced voltage. The gate of transistor 503 can receive Vref, whereas the gate of transistor 504 can receive a termination control signal TERM_control from transmitter 202.

Note that the purpose of $LSU_1$-$LSU_P$ is to provide safe binary outputs to enable/disable $TTS_1$-$TTS_M$ with an internal voltage supply lower than the far-end termination voltage. The binary output high voltage level is derived from the far-end termination voltage. This dependency between the binary output voltage and the far-end termination voltage enhances the portability of this design into other supply voltages and processes. In the described embodiment, $LSU_1$-$LSU_P$ can advantageously use the signals on txp and txm, the reference voltage Vref, Vbias, and the termination control signal TERM_control to derive these binary outputs. Specifically, LSU 500 can advantageously generate disable and enable signals on node 505 to ensure safe, reliable functioning of its associated TTS(s).

To put transistor 204 in a high impedance state, a logic one must be applied to the transistor's gate. This logic one must be as high as any pad voltage, i.e. the high voltage on txp or txm. In one embodiment, when transistor 204 is in high impedance state, node 505 can be pulled up to the average of txp and txm, i.e. VCM.

To turn on transistor 204, a logic zero must be applied to the transistor's gate. This logic zero must be low enough to trigger channel connectivity, but not so low as to stress transistor 204 (e.g. where Vgs and Vgd is less than 2.5 V+10%). In one embodiment, when transistor 204 is to be turned on, node 505 can be pulled down to Vbias (via conducting transistors 503 and 504). In one embodiment, Vbias may be 1.2 V, although this voltage can vary based on device fabrication and technology node.

In one embodiment, transistor 204 can be fabricated such that its on resistance is much lower than the resistances provided by resistors 205. Transistor 503 can be fabricated to have a gate length slightly longer (e.g. on the order of +10% to +20%) than a minimum gate length used for transmitter PHY 301, thereby increasing its reliability. Transistor 504 can be fabricated with a standard gate length. In one embodiment, both transistors 503 and 504 can be fabricated with a thick oxide.

Figure 6:
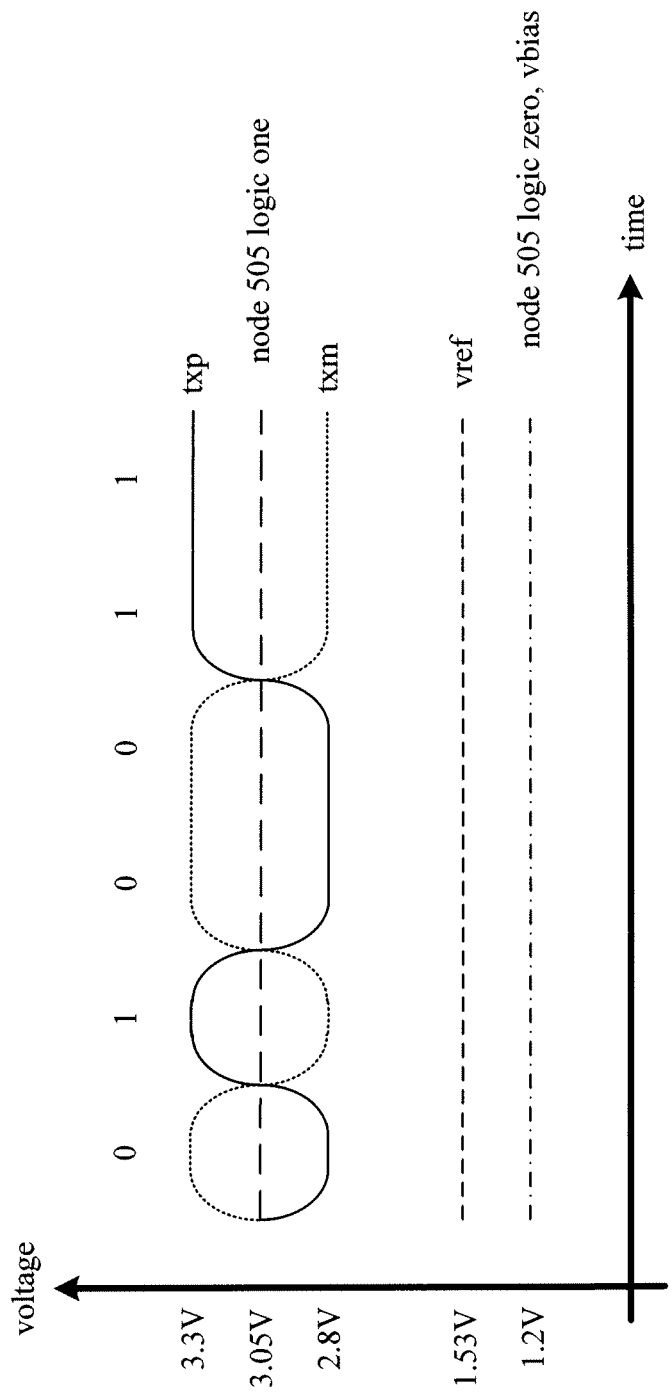
FIG. 6 illustrates exemplary voltages on txp and txm over time.

In one embodiment, the TERM_control signal can turn transistor 504 on or off using a full rail CMOS swing, e.g. 0-2.5 V (or 0-1.8 V, depending on the design). In contrast, Vref always tracks the common mode voltage VCM, thereby ensuring that transistor 503 and 504 are not stressed. Note that Vref can also be provided to a driver in transmitter 202 (not shown for clarity), which also protects the transistors in that driver. FIG. 6 illustrates exemplary voltages on txp and txm over time. Note that the TERM_control signal consists of 6 control bits. Each control bit can be provided to an LSU that controls a set of TTSs, e.g. bit 5 of TERM_CONTROL could effectively control $TTS_{16}$-$TTS_{31}$ in one embodiment. That is, the bit provided by the TERM_control signal turns transistor 504 on or off, thereby determining the signal provided to the TTS set.]

Thus, as described above, a far-end termination voltage (e.g. 3.3 V of receiver PHY 104) can be used to derive an internal near-end reference voltage (i.e. Vref). This near-end reference voltage can be used to safely enable/disable the output stage termination of transmitter PHY 301. Because Vref is generated from the far-end supply (i.e. a pad voltage), Vref is present even when transmitter PHY 301 is power off. Hence, permit stress free conditions in both power on and off modes.

Transmitter termination 305 can provide distinct advantages over other HDMI TX approaches. For example, transmitter termination 305, which is configured as a differential source termination, can ensure low overall system power. Further, transmitter termination 305 can be easily integrated into deep sub-micron process nodes without the need for an external voltage supply or any external components (to transmitter PHY 301), thereby ensuring low cost implementation. Yet further, transmitter output stage 305 can ensure stress-free operation, thereby ensuring reliability of source termination.

Although illustrative embodiments of the invention have been described in detail herein with reference to the accompanying figures, it is to be understood that the invention is not limited to those precise embodiments. For example, although described in reference to HDMI, the above-described transmitter output stage can be used in any DC coupled system that requires far-end termination to a high voltage I/O supply rail. Moreover, although implementation details described above may apply to specific I/O voltage supplies, the reference generator and Tx termination slices can be scaled to other I/O voltage supplies.

Therefore, the embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A transmitter physical layer comprising:
   a transmitter; and
   a transmitter termination operatively coupled to the transmitter, the transmitter termination including:
   a tunable source termination coupled between a differential pair of the transmitter; and
   a reference voltage generator for generating a reference voltage from a far-end termination, the reference voltage minimizing junction stress of switching transistors in the tunable source termination and the transmitter, wherein an output of the reference voltage generator includes a control signal provided to the tunable source termination.

2. The transmitter physical layer of claim 1, wherein the tunable source termination includes a plurality of transmitter termination slices, each transmitter termination slice including:
   a switching transistor;
   a first resistor coupled between the switching transistor and one of the differential pair; and
   a second resistor connected between the switching transistor and an other of the differential pair.

3. The transmitter physical layer of claim 2, wherein the reference voltage generator includes:

a plurality of level-shift-up blocks (LSUs) coupled between the differential pair, each LSU providing a control voltage to a predetermined set of switching transistors.

4. The transmitter physical layer of claim 3, wherein the plurality of LSUs provide binary weighted outputs to the plurality of transmitter termination slices.

5. The transmitter physical layer of claim 4, wherein each LSU provides its binary weighted output to a different number of transmitter termination slices.

6. The transmitter physical layer of claim 3, wherein each LSU includes:
   a third resistor and a fourth resistor connected in series between the differential pair;
   a first transistor and a second transistor connected in series between a first node located between the third and fourth resistors and a bias voltage, the first node controlling at least one switching transistor.

7. The transmitter physical layer of claim 6, wherein the reference voltage generator further includes:
   a fifth resistor and a sixth resistor connected between the differential pair, wherein a common mode voltage (VCM) node between the fifth and sixth resistors is connected to a well of each switching transistor.

8. The transmitter physical layer of claim 7, wherein the reference voltage generator further includes:
   a set of resistors connected in series between the VCM node and ground, wherein a tap provided between resistors of the set of resistors provides a reference voltage that tracks the common mode voltage.

9. The transmitter physical layer of claim 8, wherein the reference voltage controls a gate of each first transistor, and wherein a termination control signal generated by the transmitter controls a gate of each second transistor.

10. The transmitter physical layer of claim 1, wherein the transmitter physical layer conforms to a high-definition multimedia interface (HDMI) specification.

11. A transmitter termination for coupling to a transmitter, the transmitter termination including:
    a tunable source termination coupled between a differential pair of the transmitter; and
    a reference voltage generator for generating a reference voltage from a far-end termination, the reference voltage minimizing junction stress of switching transistors in the tunable source termination and the transmitter, wherein an output of the reference voltage generator includes a control signal provided to the tunable source termination.

12. The transmitter termination of claim 11, wherein the tunable source termination includes a plurality of transmitter termination slices, each transmitter termination slice including:
    a switching transistor;
    a first resistor coupled between the switching transistor and one of the differential pair; and
    a second resistor connected between the switching transistor and an other of the differential pair.

13. The transmitter termination of claim 12, wherein the reference voltage generator includes:
    a plurality of level-shift-up blocks (LSUs) coupled between the differential pair, each LSU providing a control voltage to a predetermined set of switching transistors.

14. The transmitter termination of claim 13, wherein the plurality of LSUs provide binary weighted outputs to the plurality of transmitter termination slices.

15. The transmitter termination of claim 14, wherein each LSU provides its binary weighted output to a different number of transmitter termination slices.

16. The transmitter termination of claim 13, wherein each LSU includes:
    a third resistor and a fourth resistor connected in series between the differential pair;
    a first transistor and a second transistor connected in series between a first node located between the third and fourth resistors and a bias voltage, the first node controlling at least one switching transistor.

17. The transmitter termination of claim 16, wherein the reference voltage generator further includes:
    a fifth resistor and a sixth resistor connected between the differential pair, wherein a common mode voltage (VCM) node between the fifth and sixth resistors is connected to a well of each switching transistor.

18. The transmitter termination of claim 17, wherein the reference voltage generator further includes:
    a set of resistors connected in series between the VCM node and ground, wherein a tap provided between resistors of the set of resistors provides a reference voltage that tracks the common mode voltage.

19. The transmitter termination of claim 18, wherein the reference voltage controls a gate of each first transistor, and wherein a termination control signal generated by the transmitter controls a gate of each second transistor.

20. The transmitter termination of claim 19, wherein the transmitter termination is implemented with a high-definition multimedia interface (HDMI) transmitter.

21. A method of designing a transmitter termination for coupling to a transmitter, the method comprising:
    providing a tunable source termination coupled between a differential pair of the transmitter; and
    providing a reference voltage generator for generating a reference voltage from a far-end termination, the reference voltage minimizing junction stress of switching transistors in the tunable source termination and the transmitter, wherein an output of the reference voltage generator includes a control signal provided to the tunable source termination.

22. The method of claim 21, wherein providing the tunable source termination includes providing a plurality of transmitter termination slices, wherein providing the plurality of transmitter termination slices includes, for each transmitter termination slice:
    providing a switching transistor;
    providing a first resistor coupled between the switching transistor and one of the differential pair; and
    providing a second resistor connected between the switching transistor and an other of the differential pair.

23. The method of claim 22, wherein providing the reference voltage generator includes:
    providing a plurality of level-shift-up blocks (LSUs) coupled between the differential pair, each LSU providing a control voltage to a predetermined set of switching transistors.

24. The method of claim 23, wherein providing the plurality of LSUs includes providing binary weighted outputs to the plurality of transmitter termination slices from the plurality of LSUs.

25. The method of claim 24, wherein providing the plurality of LSUs includes each LSU providing its output to a different number of transmitter termination slices.

26. The method of claim 23, wherein providing the plurality of LSUs includes, for each LSU:

providing a third resistor and a fourth resistor connected in series between the differential pair;

providing a first transistor and a second transistor connected in series between a first node located between the third and fourth resistors and a bias voltage, the first node controlling at least one switching transistor.

27. The method of claim 26, wherein providing the reference voltage generator further includes:

providing a fifth resistor and a sixth resistor connected between the differential pair, wherein a common mode voltage (VCM) node between the fifth and sixth resistors is connected to a well of each switching transistor.

28. The method of claim 27, wherein providing the reference voltage generator further includes:

providing a set of resistors connected in series between the VCM node and ground, wherein a tap provided between resistors of the set of resistors provides a reference voltage that tracks the common mode voltage.

29. A method to enable/disable a source termination of a transmitter, the method comprising:

providing a plurality of parallel resistances between a differential pair of the transmitter;

selecting a set of parallel resistances from the plurality of parallel resistances for the source termination;

deriving a reference voltage from a common mode voltage associated with the differential pair; and protecting switches in the set of parallel resistances using the reference voltage.

\* \* \* \* \*